(12) United States Patent
Nakano et al.

(10) Patent No.: US 7,226,053 B2
(45) Date of Patent: Jun. 5, 2007

(54) SHAFT SEAL MECHANISM, SHAFT SEAL MECHANISM ASSEMBLING STRUCTURE AND LARGE SIZE FLUID MACHINE

(75) Inventors: Takashi Nakano, Takasago (JP); Hirokazu Shirai, Takasago (JP); Toshio Asada, Takasago (JP); Shin Nishimoto, Takasago (JP); Tanehiro Shinohara, Takasago (JP); Hidekazu Uehara, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 25 days.

(21) Appl. No.: 10/848,315

(22) Filed: May 19, 2004

(65) Prior Publication Data

US 2005/0012275 A1 Jan. 20, 2005

(30) Foreign Application Priority Data

May 21, 2003 (JP) .............................. 2003-143271

(51) Int. Cl.
 *F01D 11/02* (2006.01)
 *F16J 15/44* (2006.01)
 *F16J 15/447* (2006.01)
(52) U.S. Cl. ...................... 277/355; 277/412; 277/413
(58) Field of Classification Search ................ 277/355, 277/347, 412, 413, 421
 See application file for complete search history.

(56) References Cited

U.S. PATENT DOCUMENTS

| 4,202,554 | A | * | 5/1980 | Snell .......................... 277/355 |
| 5,135,237 | A | * | 8/1992 | Flower ........................ 277/355 |
| 5,480,165 | A | * | 1/1996 | Flower ........................ 277/355 |
| 6,045,134 | A | * | 4/2000 | Turnquist et al. ........... 277/347 |
| 6,139,019 | A | * | 10/2000 | Dinc et al. .................. 277/355 |
| 6,250,640 | B1 | * | 6/2001 | Wolfe et al. ................ 277/355 |
| 6,267,381 | B1 | * | 7/2001 | Wright ....................... 277/355 |
| 6,308,958 | B1 | * | 10/2001 | Turnquist et al. ........... 277/355 |
| 6,331,006 | B1 | * | 12/2001 | Baily et al. ................. 277/355 |
| 6,540,231 | B1 | * | 4/2003 | Trantow et al. ............. 277/355 |

(Continued)

FOREIGN PATENT DOCUMENTS

JP 2000-097350 4/2000

(Continued)

*Primary Examiner*—Patricia Engle
*Assistant Examiner*—Gilbert Lee
(74) *Attorney, Agent, or Firm*—Wenderoth, Lind & Ponack, L.L.P.

(57) ABSTRACT

A shaft seal mechanism (leaf seal) by which a desired seal performance can be stably obtained is provided. The shaft seal mechanism comprises a concave groove 71 formed larger than a minimum size of a plate width of thin plates 29 and a fitting piece 61 fitted in a gap between the concave groove 71 and a leaf seal 25. The leaf seal 25 comprises an annular thin plate assembly 29A constructed by the thin plates 29 and a plate spring 56 integrally formed therewith supporting the annular thin plate assembly 29A to be levitated coaxially with a rotating shaft 23. The thin plates 29 have their outer circumferential proximal end side made movable relative to the concave groove 71. A shaft seal mechanism assembling structure is also provided comprising a pressure receiving surface 61b and a lower pressure side plate 54 forming a predetermined gap size between the pressure receiving surface 61b and one side edges of the thin plates 29.

20 Claims, 9 Drawing Sheets

U.S. PATENT DOCUMENTS

| | | | |
|---|---|---|---|
| 6,550,777 B2* | 4/2003 | Turnquist et al. | 277/355 |
| 6,609,888 B1* | 8/2003 | Ingistov | 415/231 |
| 6,644,668 B1* | 11/2003 | Albers et al. | 277/355 |
| 6,840,519 B2* | 1/2005 | Dinc et al. | 277/413 |
| 2002/0105146 A1* | 8/2002 | Uehara et al. | 277/355 |
| 2002/0117807 A1* | 8/2002 | Yoshida et al. | 277/412 |
| 2005/0098958 A1* | 5/2005 | Ebert et al. | 277/355 |
| 2006/0033285 A1* | 2/2006 | Nishimoto et al. | 277/355 |

FOREIGN PATENT DOCUMENTS

| | | |
|---|---|---|
| JP | 2002-13647 | 1/2002 |
| JP | 2003-106105 | 4/2003 |
| JP | 2003-113945 | 4/2003 |

* cited by examiner

SHAFT SEAL MECHANISM, SHAFT SEAL MECHANISM ASSEMBLING STRUCTURE AND LARGE SIZE FLUID MACHINE

BACKGROUND OF THE INVENTION

1. Field of the Invention

The present invention relates to a shaft seal mechanism appropriately used for a rotating shaft or the like of a large size fluid machine, such as a gas turbine, steam turbine, compressor, water turbine, refrigerator, pump or the like and also relates to a shaft seal mechanism assembling structure and large size fluid machine both using this shaft seal mechanism.

2. Description of the Prior Art

Generally, a shaft seal mechanism is provided around a rotating shaft of a gas turbine, steam turbine or the like, for reducing leakage of working fluid leaking to a lower pressure side from a higher pressure side. As one example of such a shaft seal mechanism, a known leaf seal is shown in the Japanese laid-open patent application 2002-13647.

FIG. 9 is a cross sectional view of one example of a prior art leaf seal (shaft seal mechanism) of the kind mentioned above, wherein this leaf seal is seen on a cross section along an axis of a rotating shaft. In FIG. 9, numeral 1 designates a leaf seal and numeral 2 a rotating shaft. The leaf seal 1 is constructed such that a plurality of thin plates 3 of a flat shape having a predetermined size of a plate width in an axial direction of the rotating shaft 2 are arranged in layers in which a minute gap is provided between each of the thin plates 3 in a circumferential direction of the rotating shaft 2 so that a thin plate assembly 9 forms an annular shape. These thin plates 3 have their outer circumferential proximal end side fixed to a split housing or leaf seal ring 5 (5a, 5b) via a brazed portion 4, and their inner circumferential distal end side arranged at an incline with an acute angle relative to an outer circumferential surface of the rotating shaft 2, so as to make a slidable contact with the outer circumferential surface of the rotating shaft 2 by a pre-load. It is to be noted that the leaf seal ring 5 is constructed by assembling together a pair of split seal rings 5a, 5b. Also, each of the thin plates 3, when seen on a plan view, has a T-shape in which the width w1 of the above-mentioned outer circumferential proximal end side is larger than the width w2 of the above-mentioned inner circumferential distal end side.

By the construction mentioned above, the thin plates 3 seal the outer circumferential surface of the rotating shaft 2, and thereby an annular space formed around the rotating shaft 2 is divided into a higher pressure side area and a lower pressure side area. Also, the leaf seal ring 5 comprises a higher pressure side plate 7 on the side of the higher pressure side area, and a lower pressure side plate 8 on the side of the lower pressure side area, so that the thin plates 3 are fitted in between the higher pressure side plate 7 and the lower pressure side plate 8. The respective side plates 7, 8 are also arranged to function as a guide plate for guiding a direction to which pressure acts.

The leaf seal 1 constructed as mentioned above is inserted to be retained in a concave groove 10 of a T-shape formed in a stator side. When the rotating shaft 2 rotates, a dynamic pressure effect is caused by the rotation of the rotating shaft 2, which causes the distal end of each of the thin plates 3 to be levitated away from the outer circumferential surface of the rotating shaft 2 so that there is no contact between the distal ends of the thin plates 3 and the rotating shaft 2. Thereby, abrasion of the thin plates 3 is avoided and the seal life is elongated.

In the prior art shaft seal mechanism (the leaf seal 1), a desired seal performance cannot be stably obtained due to the three shortcomings mentioned below:

(1) For a device in which the shaft seal mechanism (the leaf seal 1) is to be provided, there are strong demands to make the device compact, and efforts are being made for reducing the entire size of the shaft seal mechanism, for example by reducing the thickness. However, as mentioned below, assembly of a smaller shaft seal mechanism into the stator is difficult, which causes problems with the manufacture and employment of the device.

In order to make the shaft seal mechanism smaller, it is considered whether to make the leaf seal ring 5 side thinner. In this case, an optimized shape of the leaf seal ring 5 will have a cross-sectional T-shape having the radial directional portion elongated and the outer circumferential portion formed larger than the inner circumferential portion so as to meet the shape of the thin plates 3. The concave groove to retain the leaf seal ring 5 is also needed to be made in such a shape as to have the radial directional portion deepened and the bottom portion (the outer circumferential portion) formed larger. But to create such a shape of the concave groove in the stator is generally difficult, and even if a compact shaft seal mechanism is developed, there might be a case where actual employment thereof is difficult. Hence, where the shaft seal mechanism, when seen on a cross section including an axis of the rotating shaft, has a shape having the radial directional portion elongated and the outer circumferential proximal end side formed larger than the inner circumferential distal end side, a structure into which this shaft seal mechanism can be easily assembled is desired. It is also desired to reduce the size of the presently employed thin plates 3. But if the thin plates 3 are smaller than the present size, there is a possibility that a desired seal performance may not be stably obtained.

(2) At the turbine start-up time, the leaf seal 1, experiences a downward-acting force caused by its own weight. If an eccentricity is caused by this force, there is a possibility that the distal ends of the annularly arranged thin plates 3 will strongly contact with the outer circumferential surface of the rotating shaft 2 at one place in the circumferential direction (upper portion). If the rotating shaft 2 is rotating while such a strong contact is being maintained, there is a risk that the thin plates 3 and the rotating shaft 2 will be damaged. Therefore, it is considered that a spring member is fixed to the stator side to support the weight of the leaf seal 1 (illustration omitted). If the leaf seal 1 is so levitated, the above-mentioned problems will be avoided.

However, as seen on the cross section of FIG. 9, during continuous operation, the leaf seal 1 receives a fluid force toward the lower pressure side area from the higher pressure side area. However, at the turbine start-up time, the leaf seal 1 receives a fluid force acting in the reverse direction because the pressure in the turbine is reduced to vacuum. Hence, when the start-up state is changed over to the continuous operation state, the leaf seal 1 receives the fluid force reversed from one direction to the other in the rotor axial direction and thereby the leaf seal 1 makes a sliding motion along the rotor axial direction by the length of the fitting allowance relative to the stator side.

If the above-mentioned spring member is fixed to the stator side, when the leaf seal 1 makes the sliding motion, the leaf seal 1 generates such a force as to bend the spring member in the rotor axial direction at the outer circumferential surface portion of the leaf seal 1. The spring member, while receiving such a bending force, may by some chance bite into the outer circumferential surface of the leaf seal 1 so that the normal activating function thereof cannot be exhibited. Then, an eccentric activating force is given onto the leaf seal 1 and this invites a possibility that the seal performance of the leaf seal 1 is badly influenced. Thus, a means is desired which allows a stable seal performance to be obtained, but does not cause any interference with the activating member.

(3) While the prior art leaf seal 1 is manufactured such that each of the thin plates 3 is fitted in between the two split leaf seal rings 5a, 5b, and the jointing portion between the split leaf seal rings 5a, 5b is fixed by welding or bolting, it is known that a gap size formed between the thin plates 3 and the lower pressure side plate 8 affects the seal performance of the leaf seal 1. Hence, it is desired to control this gap size so as to be maintained as designed. However, at the present situation, because of various reasons, such as welding strain caused at the manufacturing time, excess torque of bolting, and working accuracy of the split leaf seal rings 5a, 5b, it is difficult to control the gap size formed between the thin plates 3 and the lower pressure side plate 8 to be maintained as designed. Thus, a means by which a desired seal performance can be stably obtained is desired.

SUMMARY OF THE INVENTION

In view of the above-mentioned circumstances of the prior art, it is an object of the present invention to provide a means by which a desired seal performance can be stably obtained.

In order to achieve the above-mentioned object, the present invention provides the following means:

A shaft seal mechanism assembling structure of the present invention is characterized by comprising a shaft seal mechanism assembled in a stator, in which the shaft seal mechanism is constructed such that a plurality of thin plates are arranged in an annular space between a rotor and the stator so as to form an annular thin plate assembly. The thin plates have their outer circumferential proximal end side attached to the side of the stator and their inner circumferential distal end side non-fixed to an outer circumferential surface of the rotor so that the annular thin plate assembly divides the annular space between the rotor and the stator into a higher pressure side area and a lower pressure side area. The shaft seal mechanism assembling structure comprises a concave groove that is provided on the side of the stator, and when seen on a cross section including an axis of the rotor, has a minimum groove width larger than at least a minimum plate width of each of the thin plates, and a fitting member that is fitted in a gap formed between the concave groove and each of the thin plates, when seen on the cross section, in the state that each of the thin plates is assembled in the concave groove.

According to the shaft seal mechanism assembling structure of the present invention, such a structure is employed that the concave groove is provided on the side of the stator and has a minimum groove width larger than at least the minimum plate width of the thin plates, and the fitting member fitted in the gap formed between the concave groove and the thin plates in the state that the thin plates are assembled in the concave groove. Thus, the gap formed when the shaft seal mechanism is assembled in the stator can be filled by the fitting member. Hence, the minimum groove width size of the concave groove to be formed in the stator side can be worked wider than the external size of the shaft seal mechanism. Also, regardless of the external size of the shaft seal mechanism, a wider concave groove of a good workability can be worked and thereby the shaft seal mechanism having its radial directional length elongated and its outer circumferential proximal end side formed larger than its inner circumferential distal end side can be easily assembled in the stator side. Thus, the thin plates are not needed to be reduced in size for making the shaft seal mechanism compact, and a desired seal performance can be stably obtained.

In another aspect of this embodiment the fitting member, when seen on the cross section, is arranged downstream of the annular thin plate assembly and comprises another seal mechanism that, together with the annular thin plate assembly, divides the annular space into the higher pressure side area and the lower pressure side area.

The other seal mechanism, together with the shaft seal mechanism comprising the annular thin plate assembly, constitutes a multiple seal structure in which leakage of the working fluid from the higher pressure side area to the lower pressure side area can be reduced as compared to the conventional case using no such other seal mechanism.

In a second embodiment of the invention, a shaft seal mechanism is characterized by being constructed such that a plurality of thin plates are arranged in an annular space between a rotor and a stator so as to form an annular thin plate assembly. The thin plates have their outer circumferential proximal end side supported at the side of the stator and their inner circumferential distal end side non-fixed to an outer circumferential surface of the rotor so that the annular thin plate assembly divides the annular space between the rotor and the stator into a higher pressure side area and a lower pressure side area. An activating member is integrally provided on the side of the annular thin plate assembly, such that the activating member supports the annular thin plate assembly to be levitated coaxially with the rotor.

In this second embodiment, when a start-up operation state is changed over to a continuous operation state, the annular thin plate assembly, when seen on a cross section including its center line, receives a force of which acting direction is reversed from one direction to the other along the center line and makes a slide motion along the center line. However, the activating member that causes the annular thin plate assembly to levitate moves together with the annular thin plate assembly and no inclined contact nor biting of the thin plates with or to the surroundings of the annular thin plate assembly is caused. Also, as the center line of the shaft seal mechanism can be always correctly aligned with the axis of the rotor, no restriction by the biting of the activating member is caused and a desired seal performance can be stably obtained.

Another aspect of the second embodiment is characterized in that the activating member is constructed by a plate spring that is fixed to an outer circumferential portion of a leaf seal retaining member in which the annular thin plate assembly is retained. The same effect can be obtained with this aspect as can be obtained with the second embodiment discussed above.

When the annular thin plate assembly makes the slide motion, this plate spring also makes the slide motion together with the annular thin plate assembly. Thus, while the slide motion of the shaft seal mechanism relative to the stator is allowed, the activating force to levitate and support the annular thin plate assembly can be securely maintained and no inclined contact nor biting of the plate spring with or to the surrounding outer circumferential portion is caused.

In another aspect of the second embodiment, the activating member is constructed by a bent plate spring that is fixed to an outer circumferential surface of a leaf seal retaining member in which the annular thin plate assembly is retained. The bent plate spring comprises a fixed end fixed to the outer circumferential surface of the leaf seal retaining member, a free end retained to the outer circumferential surface of the leaf seal retaining member so that a relative motion thereof in an axial direction of the rotor is regulated and a relative motion thereof around an axis of the rotor is allowed, and an activating portion of a convex plate shape formed between the fixed end and the free end. The convex plate shape is swollen outward from the outer circumferential surface of the leaf seal retaining member.

According to this aspect, the same effect as the shaft seal mechanism of the second embodiment can be obtained. Also, such a structure is employed that the activating member is the bent plate spring fixed to the outer circumferential surface of the leaf seal retaining member and this bent plate spring has a fixed end, a free end and an activating portion. When the annular thin plate assembly makes the slide motion, this bent plate spring also makes the slide motion together with the annular thin plate assembly. Moreover, the relative motion of the plate spring in the slide motion direction is regulated relative to the outer circumferential surface of the leaf seal retaining member, and inclined contact nor biting of the plate spring with or to this outer circumferential surface is caused. Also, while the slide motion of the shaft seal mechanism relative to the stator is allowed, the activating force to levitate and support the annular thin plate assembly can be securely maintained.

A third embodiment of the invention is characterized by comprising a shaft seal mechanism assembled in a stator, in which the shaft seal mechanism is constructed such that a plurality of thin plates are arranged in an annular space between a rotor and the stator so as to form an annular thin plate assembly. The thin plates have their outer circumferential proximal end side supported at a concave groove on the side of the stator and their inner circumferential distal end side remains unattached to an outer circumferential surface of the rotor so that the annular thin plate assembly divides the annular space between the rotor and the stator into a higher pressure side area and a lower pressure side area. Each of the thin plates has its outer circumferential proximal end side made movable in an axial direction of the rotor in the concave groove. The shaft seal mechanism assembling structure comprises a pressure receiving surface that is provided in the concave groove so as to receive a fluid force in a case where this fluid force acts on the annular thin plate assembly toward the lower pressure side area from the higher pressure side area, when seen on a cross section including an axis of the rotor. A gap forming member is pinched between one side edge, opposed to the lower pressure side area, of each of the thin plates and the pressure receiving surface so as to form a predetermined gap size between the one side edge and the pressure receiving surface.

According to the third, embodiment of the invention, such a structure is employed that the outer circumferential proximal end side of the thin plates is made movable relative to the interior of the concave groove. The pressure receiving surface is provided in the concave groove and the gap forming member is pinched between the thin plates and the pressure receiving surface so as to form a predetermined gap. In operation, a fluid force acts on the annular thin plate assembly toward the lower pressure side area from the higher pressure side area. Then, the thin plates move toward the lower pressure side area from the higher pressure side area and the side edges opposed to the lower pressure side area of the thin plates abut against the pressure receiving surface via the gap forming member to stop there. At this time, the gap size formed between these side edges and the pressure receiving surface is ensured to become the same as the thickness size of the gap forming member. Thus, only by adjusting the thickness size of the gap forming member, can the gap size on the lower pressure side formed between the thin plates and the pressure receiving surface of the concave groove be accurately controlled as designed. Hence, a desired seal performance can be stably obtained. Also, as the gap size can be adjusted only by adjusting the thickness size of the gap forming member, an easy gap adjustment becomes possible as compared to the prior art.

One aspect of the third embodiment is characterized in that, a length of the gap forming member, when seen on the cross section, is formed smaller than a length of a higher pressure side plate arranged on the side of one side edge, opposed to the higher pressure side area, of each of the thin plates.

By making the length of the gap forming member smaller than the length of the higher pressure side plate, the gap between the pressure receiving plate and side edges of the thin plates, which is required for levitating the inner circumferential distal end side of the thin plates in operation, can be secured and at the same time the fluid pressure acting on the thin plates can be securely supported by the gap forming member. That is, standing together of both of the levitation of the inner circumferential distal end side of the thin plates and the support against the fluid pressure acting on the thin plates becomes possible.

A fourth embodiment of the invention is characterized by comprising a rotor and a stator to generate power by converting thermal energy of a high temperature and high pressure working fluid into mechanical rotational energy. The fourth embodiment further comprises a shaft seal mechanism and a shaft seal mechanism assembling structure to reduce leakage of the working fluid along the rotor, in which the shaft seal mechanism is constructed such that a plurality of thin plates are arranged in an annular space between the rotor and the stator so as to form an annular thin plate assembly. The thin plates have their outer circumferential proximal end side supported at the side of the stator and their inner circumferential distal end side remains unattached to an outer circumferential surface of the rotor so that the annular thin plate assembly divides the annular space between the rotor and the stator into a higher pressure side area and a lower pressure side area. The shaft seal mechanism assembling structure comprises a concave groove that is provided on the side of the stator and, when seen on a cross section including an axis of the rotor, has a minimum groove width larger than at least a minimum plate width of each of the thin plates and a fitting member that is fitted in a gap formed between the concave groove and each of the thin plates, when seen on the cross section, in the state that each of the thin plates is assembled in the concave groove.

According to the large size fluid machine of the fourth embodiment, the shaft seal mechanism assembling structure employed therein has the same effect as that of the first embodiment. Thus, the shaft seal mechanism having its radial directional length elongated and its outer circumferential proximal end side formed larger than its inner circumferential distal end side can be easily assembled in the stator side. Hence, employment of the shaft seal mechanism which has been reduced in size becomes possible, and it also becomes possible to make the entire device compact.

One aspect of the fourth embodiment is characterized in that, the fitting member, when seen on the cross section, is arranged downstream of the annular thin plate assembly and comprises another seal mechanism that, together with the annular thin plate assembly, divides the annular space into the higher pressure side area and the lower pressure side area. The same effect as the fourth embodiment can be obtained when this aspect is included.

Further, the other seal mechanism together with the shaft seal mechanism comprising the annular thin plate assembly constitutes a multiple seal structure. Thereby, leakage of the working fluid leaking to the lower pressure side area from the higher pressure side area can be further reduced, as compared with the conventional structure using no such other seal mechanism.

A fifth embodiment of the present invention is characterized by comprising a rotor and a stator to generate power by converting thermal energy of a high temperature and high pressure working fluid into mechanical rotational energy. The fifth embodiment further comprises a shaft seal mechanism to reduce leakage of the working fluid along the rotor, in which the shaft seal mechanism is constructed such that a plurality of thin plates are arranged in an annular space between the rotor and the stator so as to form an annular thin plate assembly. The thin plates have their outer circumferential proximal end side supported to the side of the stator and their inner circumferential distal end side remains unattached to an outer circumferential surface of the rotor so that the annular thin plate assembly divides the annular space between the rotor and the stator into a higher pressure side area and a lower pressure side area. An activating member is integrally provided on the side of the annular thin plate assembly, which supports the annular thin plate assembly such that it can be levitated coaxially with the rotor.

According to the large size fluid machine of the fifth embodiment, the same effect as the shaft seal mechanism of the second embodiment can be obtained. Further, there is no obstruction by the biting of the activating member so that the seal performance can be maintained. Thereby, time and work required for the maintenance of the shaft seal mechanism can be reduced.

One aspect of the fifth embodiment is characterized in that the activating member is constructed by a plate spring that is fixed to an outer circumferential portion of a leaf seal retaining member in which the annular thin plate assembly is retained.

This aspect of the fifth embodiment provides the same effect as when it is included in the second embodiment. Further, there is no obstruction by the biting of the activating member so that the seal performance can be maintained. Thereby, time and work required for the maintenance of the shaft seal mechanism can be reduced.

Another aspect of the fifth embodiment is characterized in that the activating member is constructed by a bent plate spring that is fixed to an outer circumferential surface of a leaf seal retaining member in which the annular thin plate assembly is retained. The bent plate spring comprises a fixed end fixed to the outer circumferential surface of the leaf seal retaining member, a free end retained to the outer circumferential surface of the leaf seal retaining member so that a relative motion thereof in an axial direction of the rotor is regulated and a relative motion thereof around an axis of the rotor is allowed, and an activating portion of a convex plate shape formed between the fixed end and the free end. The convex plate shape being swollen outward from the outer circumferential surface of the leaf seal retaining member.

All the effects of the fifth embodiment are obtainable with the inclusion of this aspect. Further, while the slide motion of the shaft seal mechanism relative to the stator is allowed, the activating force to levitate and support the annular thin plate assembly can be securely maintained.

A sixth embodiment of the present invention is characterized by comprising a rotor and a stator to generate power by converting thermal energy of a high temperature and high pressure working fluid into mechanical rotational energy. The sixth embodiment further comprises a shaft seal mechanism and a shaft seal mechanism assembling structure to reduce leakage of the working fluid along the rotor, in which the shaft seal mechanism is constructed such that a plurality of thin plates are arranged in an annular space between the rotor and the stator so as to form an annular thin plate assembly. The thin plates have their outer circumferential proximal end side supported in a concave groove on the side of the stator and their inner circumferential distal end side remains unattached to an outer circumferential surface of the rotor so that the annular thin plate assembly divides the annular space between the rotor and the stator into a higher pressure side area and a lower pressure side area. Each of the thin plates has its outer circumferential proximal end side made movable in an axial direction of the rotor in the concave groove. The shaft seal mechanism assembling structure comprises a pressure receiving surface that is provided in the concave groove so as to receive a fluid force in a case where the fluid force acts on the annular thin plate assembly toward the lower pressure side area from the higher pressure side area, when seen on a cross section including an axis of the rotor. A gap forming member is pinched between one side edge, opposed to the lower pressure side area, of each of the thin plates and the pressure receiving surface so as to form a predetermined gap size between the one side edge and the pressure receiving surface.

According to the large size fluid machine of the sixth embodiment, the same effect as the shaft seal mechanism assembling structure the third embodiment can be obtained. Therefore, the shaft seal mechanism assembling structure can ensure the high seal performance as compared with the conventional case and a further higher efficiency of the large size fluid machine becomes possible.

One aspect of the sixth embodiment is characterized in that a length of the gap forming member, when seen on the cross section, is formed smaller than a length of a higher pressure side plate arranged on the side of one side edge, opposed to the higher pressure side area, of each of the thin plates.

This aspect of the sixth embodiment provides the same effect as when it is combined with the third embodiment. That is, by making the length of the gap forming member smaller than the length of the higher pressure side plate, standing together both of the levitation of the inner circumferential distal end side of the thin plates and the support against the fluid pressure acting on the thin plates becomes possible.

BRIEF DESCRIPTION OF THE DRAWINGS

3(a) is a cross sectional view including the axis of the rotating shaft and FIG. 3(b) is a cross sectional view taken on line A—A of FIG. 3(a).

FIG. 5 is an explanatory view of the leaf seal of FIG. 1 and comprises FIGS. 5(a) and 5(b), wherein FIG. 5(a) is a partial plan view and FIG. 5(b) is a cross sectional view taken on line B—B of FIG. 5(a).

FIG. 7 is an explanatory view showing a manufacturing process of the leaf seal of FIG. 1 and comprises FIG. 7(a) to 7(c), wherein FIGS. 7(a) and 7(b) show thin plates after applied with a thin plate welding process and FIG. 7(c) shows the thin plate after applied with a bending process.

DESCRIPTION OF THE PREFERRED EMBODIMENTS

One embodiment of a gas turbine comprising a leaf seal (shaft seal mechanism) according to the present invention will be described with reference to appended drawings, provided that, as a matter of course, the present invention is not to be construed as limited to the present embodiment. Also, while the present embodiment will be described with respect to an example where a large size fluid machine to which the present invention is applied is a turbine of a gas turbine, the present invention is also applicable to a rotating shaft or the like of a large size fluid machine, such as a steam turbine, compressor, water turbine, refrigerator, pump, aero gas turbine engine or the like.

Figure 1:
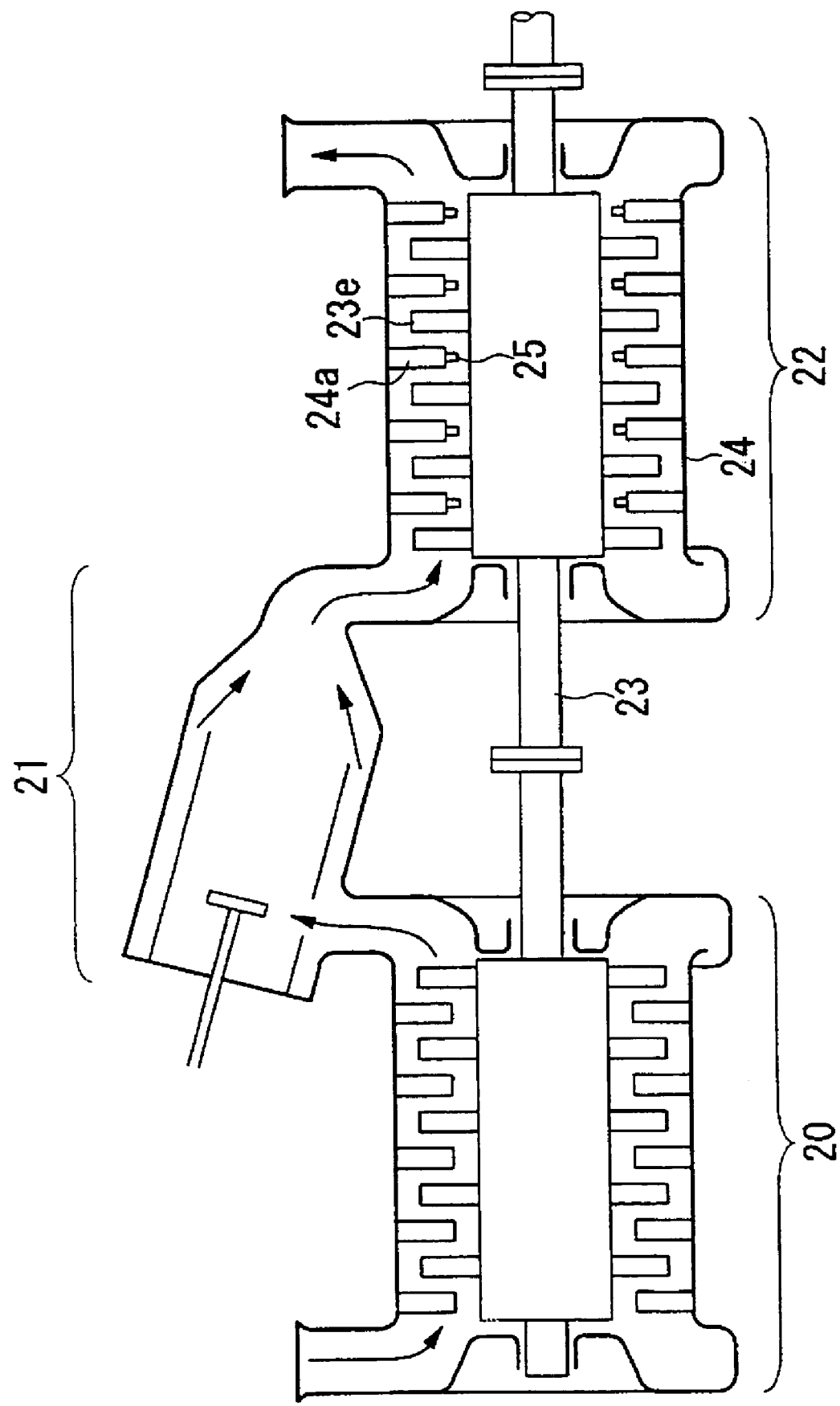
FIG. 1 is a schematic constructional cross sectional view showing an embodiment of a gas turbine comprising a leaf seal (shaft seal mechanism) according to the present invention.

FIG. 1 is a schematic constructional cross sectional view showing the embodiment of a gas turbine comprising a leaf seal (shaft seal mechanism) according to the present invention. In FIG. 1, numeral 20 designates a compressor, numeral 21 a combustor, numeral 22 a turbine and numeral 24 a stator. The compressor 20 takes thereinto a large quantity of air to be compressed. Generally, in a gas turbine, a portion of power obtained by a rotating shaft 23, as will be described below, is used as a drive force of the compressor. The combustor 21 functions to burn a mixture of fuel and the air compressed by the compressor 20. The turbine 22 introduces thereinto a combustion gas generated at the combustor 21 to be expanded so that the combustion gas so expanded is blown onto a plurality of rotor blades 23e fitted to the rotating shaft 23. Thereby, the thermal energy of the combustion gas is converted into a rotational energy so that a mechanical drive force is generated.

In the turbine 22, in addition to the plurality of rotor blades 23e arranged on the rotating shaft 23 side, a plurality of stator blades 24a are arranged on the stator 24 side, wherein the rotor blades 23e and the stator blades 24a are alternately provided in an axial direction of the rotating shaft 23. A force is exerted on each of the rotor blades 23e from the pressure of the combustion gas flowing in the axial direction of the rotating shaft 23 to thereby rotate the rotating shaft 23, so that the rotational energy given to the rotating shaft 23 is taken out from the shaft end to be effectively used. Between each of the stator blades 24a and the rotating shaft 23, a leaf seal 25 is provided as a shaft seal mechanism for reducing leakage of the combustion gas from a higher pressure side to a lower pressure side.

Figure 2:
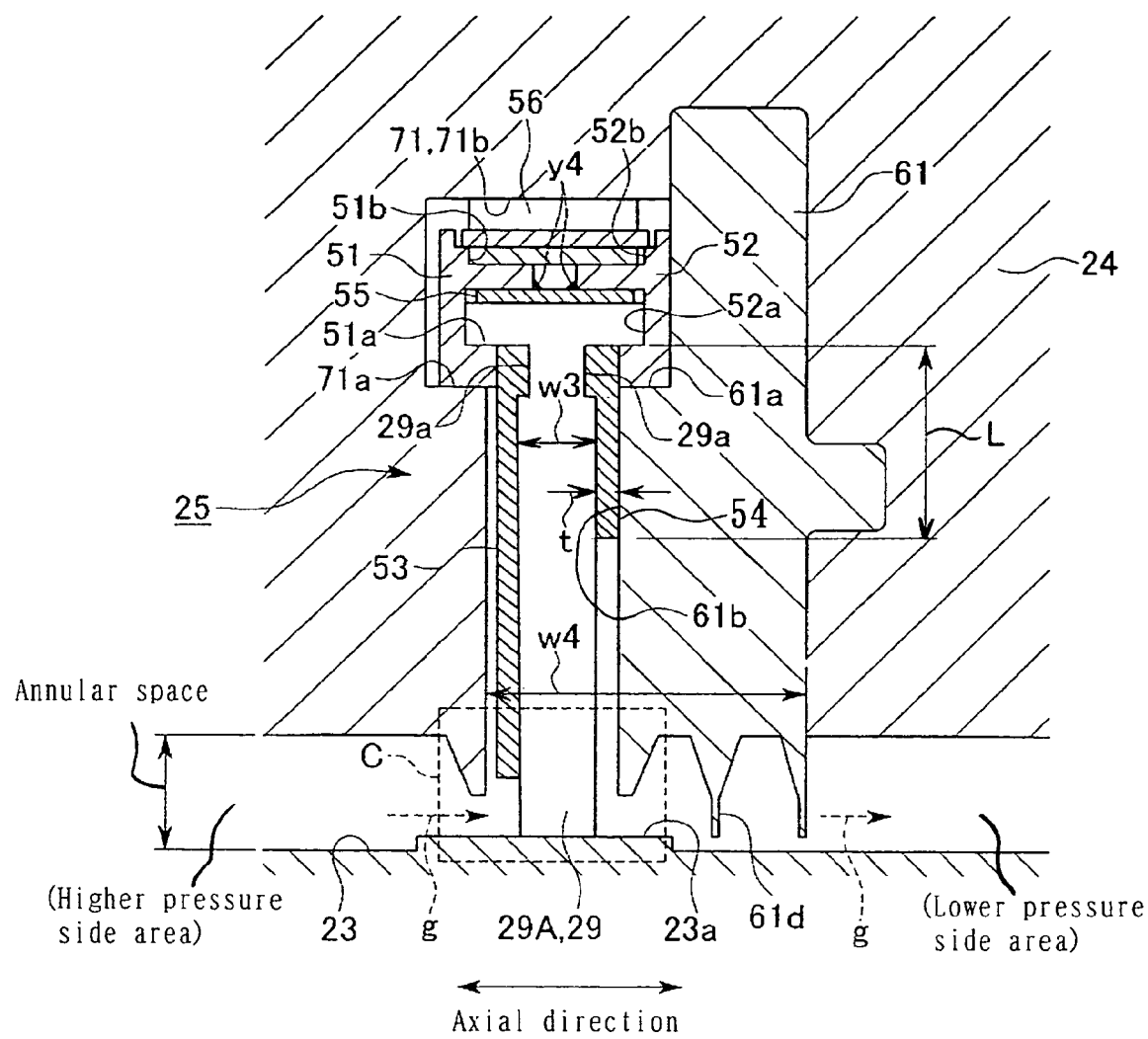
FIG. 2 is an enlarged cross sectional view of the leaf seal of FIG. 1, wherein the leaf seal, after assembled into a stator, is seen on a cross section including an axis of a rotating shaft.

FIG. 2 is an enlarged cross sectional view of the leaf seal 25, wherein the leaf seal 25, after being assembled into the stator 24, is seen on a cross section including an axis of the rotating shaft 23. Below, a description will first be made of a basic construction and basic motion of the leaf seal 25, followed by a description of a characteristic feature thereof.

As shown in FIG. 2, the leaf seal 25 is arranged to be positioned in an annular space between the rotating shaft 23 and the stator 24, and comprises a thin plate assembly 29A of an annular shape constructed by a plurality of thin plates 29 arranged in layers. Each of the thin plates 29 has its plate width direction arranged in parallel with the axial direction of the rotating shaft 23, and a minute gap is formed between each of the thin plates 29 in a circumferential direction of the rotating shaft 23.

Each of the thin plates 29 has its outer circumferential proximal end side supported to the stator 24 and its inner circumferential distal end side arranged at an incline with an acute angle relative to an outer circumferential surface 23a of the rotating shaft 23 so as to make a slidable contact therewith. By this construction, the annular thin plate assembly 29A comprising the thin plates 29 divides the annular space between the rotating shaft 23 and the stator 24 into a higher pressure side area and a lower pressure side area.

According to the leaf seal 25 constructed as mentioned above, as shown in FIG. 3(a), with respect to an upper surface 29a and a lower surface 29b of each of the thin plates 29, when a gas pressure leaking to the lower pressure side area from the higher pressure side area adds to each of the thin plates 29, the gas pressure is largest at a corner portion r1, opposed to the higher pressure side area, of the inner circumferential distal end side, so that a gas pressure distribution 30a is formed in which the gas pressure is gradually weakened toward a corner portion r2 at a diagonal position relative to the corner portion r1. It is to be noted that, while the actual thin plates 29 have the T-shape, when seen on its plane side as shown in FIG. 2, FIG. 3(a) only the rectangular portion in which deflection is generated is illustrated for simplicity.

In the present embodiment, while the example where each of the thin plates 29 has the T-shape in which the plate width changes when seen on its plane side is described, the shape of the thin plate is not limited thereto and a rectangular shape having a constant plate width may be used instead. Even in this case, a T-shape is partially needed so as to be pinched between leaf seal retainers as described below.

By forming such gas pressure distribution 30a as shown in FIG. 3(a), where each of the thin plates 29 is seen on a cross section taken on a plane perpendicular to the plate width direction, as shown in FIG. 3(b), a surface of the thin plate 29 opposed to the rotating shaft 23 is the lower surface 29b and a surface on the back side thereof is the upper surface 29a. When the gas pressure leaking to the lower pressure side area from the higher pressure side area adds to the thin plate 29, it becomes possible to adjust the gas pressure so that the gas pressure acting on the lower surface 29b is larger than the gas pressure acting on the upper surface 29a at an arbitrary position along the mentioned cross section of the thin plate 29.

That is, the gas g leaking to the lower pressure side area from the higher pressure side area flows between an outer circumferential surface 23a of the rotating shaft 23 and a distal end of the thin plate 29, and also flows along the upper surface 29a and the lower surface 29b of the thin plate 29.

At this time, as shown in FIG. 3(a), the gas g flowing along the upper surface 29a and the lower surface 29b of the thin plate 29 flows in between the higher pressure side plate 27 and the outer circumferential surface 23a of the rotating shaft 23 to flow radially toward the corner portion r2 from the corner portion r1 so that an area of lower pressure spreads to the outer circumferential proximal end side. Thus, a gas pressure distribution 30b, 30c of the gas pressure acting perpendicularly on the upper surface 29a and the lower surface 29b, respectively, of the thin plate 29 forms a triangular shape of distribution, as shown in FIG. 3(b), in which the gas pressure becomes larger as it approaches the inner circumferential distal end side and becomes smaller as it approaches to the outer circumferential proximal end side.

While the gas pressure distribution 30b on the upper surface 29a and the gas pressure distribution 30c on the lower surface 29b have approximately the same shape between each other, as the thin plate 29 is arranged at an incline with an acute angle relative to the outer circumferential surface 23a of the rotating shaft 23, a deviation of a length s1 is generated between the relative positions of the respective gas pressure distributions 30b, 30c on the upper and lower surfaces 29a, 29b. Thus, if the gas pressures of the upper surface 29a and the lower surface 29b at an arbitrary point P on a line elongating to the distal end side from the outer circumferential proximal end side of the thin plate 29 are compared with each other, a differential gas pressure is created between them.

That is, at the arbitrary point P in the length direction of the thin plate 29, a gas pressure Fb acting on the lower surface 29b becomes higher than a gas pressure Fa acting on the upper surface 29a and this acts in the direction to deform the thin plate 29 so that the thin plate 29 is levitated from the rotating shaft 23. At this time, in the vicinity of the inner circumferential distal end of the thin plate 29, while the gas pressure reversely acts only on the upper surface 29a (the outermost end portion of the thin plate 29 is inclinedly cut so as to form a cut-off surface 29c for making a plane contact with the outer circumferential surface 23a so that no portion corresponding to the lower surface 29b exists.), this force is canceled by the gas flowing between the outer circumferential surface 23a and the inner circumferential distal end of the thin plate 29 which generates a gas pressure Fc acting in the direction to levitate the inner circumferential distal end of the thin plate 29. Hence, no force is generated which would direct the inner circumferential distal end of the thin plate 29 against the rotating shaft 23. Thus, the pressure load added by the gas pressure to the thin plate 29 becomes (Fb+Fc)>Fa and this enables to deform the thin plate 29 so as to be levitated from the outer circumferential surface 23a.

As mentioned above, by generating the differential pressure between the upper surface 29a and the lower surface 29b of the thin plate 29, the thin plate 29 is deformed so as to levitate from the outer circumferential surface 23a and thereby a non-contact state of the thin plate 29 can be formed.

In the above, while the mechanism to realize the non-contact state of the thin plate 29 with the rotating shaft 23 by using the differential pressure caused by addition of the pressure from the higher pressure side area has been described, in addition thereto, the thin plate 29 receives an action of a dynamic pressure effect caused by the rotation of the rotating shaft 23 and thereby also the thin plate 29 levitates.

That is, each of the thin plates 29 is designed so as to have a rigidity in the axial direction of the rotating shaft 23 predetermined by the plate thickness. Also, as mentioned above, each of the thin plates 29 is attached to the stator 24 so as to have an acute angle relative to the outer circumferential surface 23a of the rotating shaft 23 in the rotational direction of the rotating shaft 23. Hence, when the rotating shaft 23 stops, the inner circumferential distal end of the thin plate 29 makes contact with the rotating shaft 23 by a pre-load, but while the rotating shaft 23 rotates, the dynamic pressure effect is generated and thereby the inner circumferential distal end of the thin plate 29 is levitated and the non-contact state between the thin plate 29 and the rotating shaft 23 is realized.

Next, the characteristic feature of the leaf seal 25 having the basic construction and motion as mentioned above and the assembling structure thereof will be described with reference to FIG. 2.

As shown in FIG. 2, the leaf seal 25 of the present embodiment is constructed comprising the plurality of thin plates 29 arranged in layers in which each of the thin plates 29 is a plate approximately of a T-shape having a plate width of the above-mentioned outer circumferential proximal end side formed larger than a plate width of the above-mentioned inner circumferential distal end side. The leaf seal 25 is also comprised of two leaf seal retainers 51, 52 (thin plate retaining rings) which form a leaf seal retaining member. The leaf seal retaining member retains and supports the thin plates 29 in an annular state. A higher pressure side plate 53 of an annular shape is fitted in between one side edge, opposed to the higher pressure side area, of each of the thin plates 29 and one of the leaf seal retainers 51 so as to abut on this one side edge, and a lower pressure side plate 54 (a gap forming member) of an annular shape is fitted in between the other side edge, opposed to the lower pressure side area, of each of the thin plates 29 and the other of the leaf seal retainers 52 so as to abut on this other side edge. A spacer 55 for preventing deviation is fitted in between the two leaf seal retainers 51, 52 so as to prevent a rattling movement of each of the thin plates 29 relative to the leaf seal retainers 51, 52. A plurality of plate springs 56 (activating member) supporting the annular thin plate assembly 29A to be levitated coaxially with the rotating shaft 23 is also provided.

Each of the thin plates 29 is a thin steel plate, having a flexibility, approximately of T-shape and has both its side edges formed with cut-off portions 29a. These thin plates 29 have their outer circumferential proximal end sides fixed to each other by welding (welded places will be described below with reference to FIG. 7) so as to form the thin plate assembly 29A having a flexibility as a whole.

The higher pressure side plate 53 is an annular thin plate and, when seen a cross section including the axis of the rotating shaft 23, has one side surface of its outer circumferential side portion formed with a stepped portion of which thickness is larger than a thickness of the inner circumferential side portion thereof. Likewise, the lower pressure side plate 54 is an annular thin plate and, when seen on the above-mentioned cross section, has one side surface of its outer circumferential side portion formed with a stepped portion of which thickness is larger than a thickness of the inner circumferential side portion thereof. The higher pressure side plate 53 and lower pressure side plate 54 have their respective stepped portions made engageable with the above-mentioned cut-off portions 29a of the thin plates 29 so as to make a close contact with both side surfaces of the thin plates 29 and then the so assembled members are pinched to be retained between the two leaf seal retainers 51, 52.

It is to be noted that the lower pressure side plate 54, when seen on the cross section including the axis of the rotating shaft, has its length size formed smaller than the higher pressure side plate 53. By employing such a relative size difference, both the levitation of the inner circumferential distal end side of the thin plates 29 in operation and the support against the fluid pressure acting on the thin plates 29 can be ensured.

Figure 3:
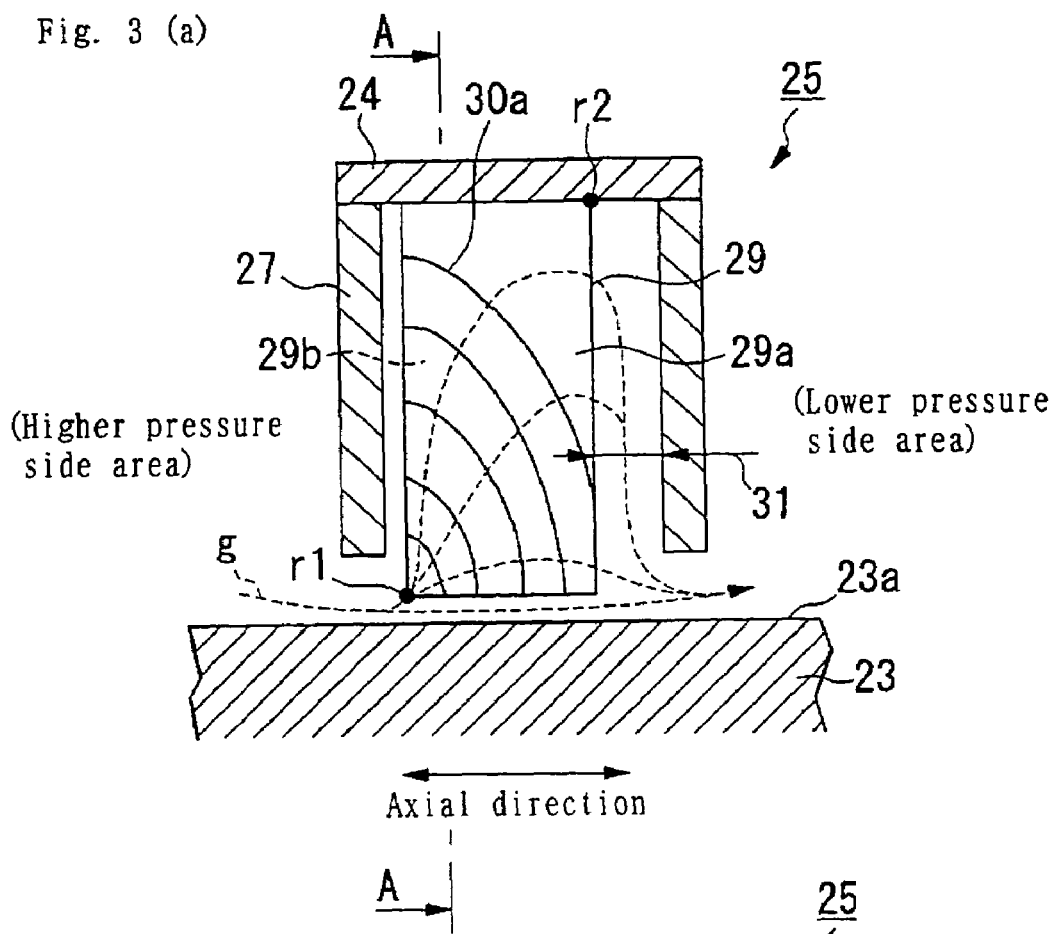
FIG. 3 is an explanatory view of a motion of the leaf seal of FIG. 1 and comprises FIGS. 3(a) and 3(b), wherein FIG.
Figure 3:
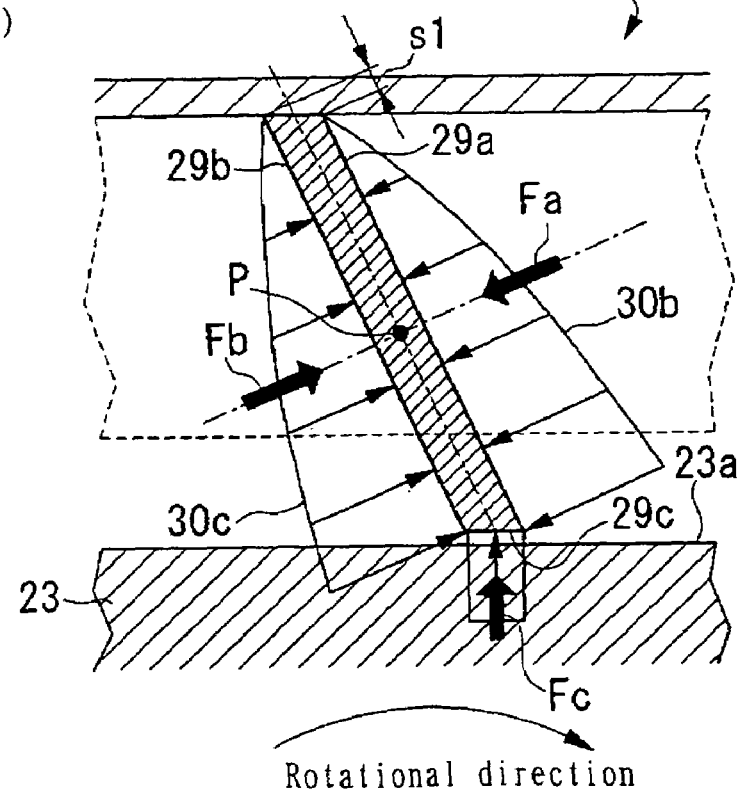

That is, in order to levitate the thin plates 29 from the rotating shaft 23, such a pressure distribution as shown in FIG. 3(*a*) is necessary, and in order to realize this, it will be ideal to arrange the lower pressure side plate 54 apart from the annular thin plate assembly 29A to thereby form a gap between them. However, the annular thin plate assembly 29A is urged in the thrust direction from the higher pressure side area (that is, if seen on FIG. 3(*a*), a rightward urging force continuously acts on the annular thin plate assembly 29A). Hence, if the lower pressure side plate 54 is arranged apart from the annular thin plate assembly 29A, support of the thin plates 29 against this urging force will be lost and a problem of strength instability of each of the thin plates 29 will arise. On the other hand, according to experiments carried out by the inventors, it is confirmed that even if a plate formed shorter than the higher pressure side plate 53 is provided at the position near the corner portion r2 of FIG. 3(*a*), there is no substantial influence on forming the pressure distribution to levitate the thin plates 29 (such pressure distribution as shown in FIG. 3(*a*)). Hence, in view of both influences of the thrust force of each of the thin plates 29 and the pressure distribution to levitate each of the thin plates 29, such a construction as to arrange the lower pressure side plate 54 made shorter than the higher pressure side plate 53 is employed.

Each of the leaf seal retainers 51, 52 is a metal member having a flexibility and, when seen on the cross section including the axis of the rotating shaft 23, has an approximate C-shape. Thus, the leaf seal retainers 51, 52, when jointed together, form concave portions 51*a*, 52*a* therein and the portion of which width is enlarged of each of the thin plates 29 and the spacer 55 are fitted in the concave portions 51*a*, 52*a*. Also, in the outer circumferential surface, concave portions 51*b*, 52*b* are formed so that the plate springs 56 are fitted therein.

Figure 4:
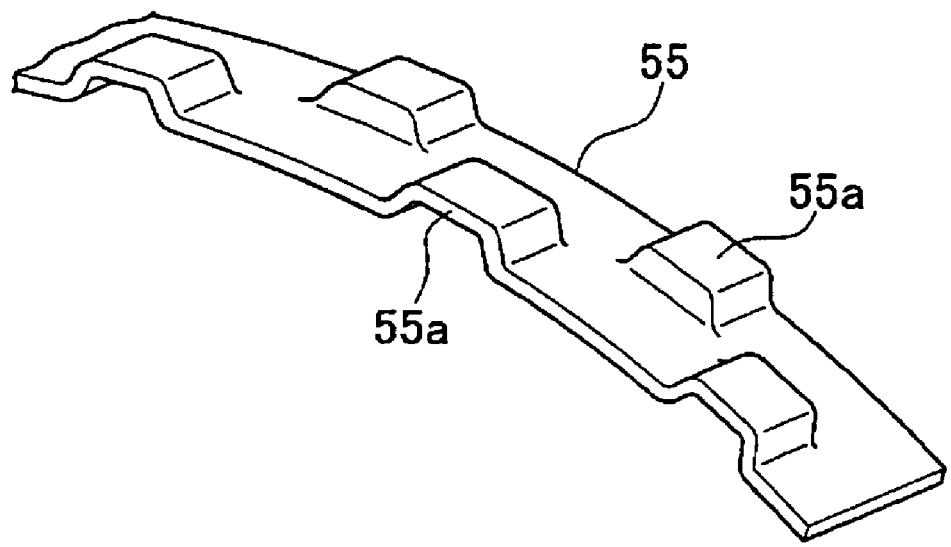
FIG. 4 is a perspective view of a spacer provided in the leaf seal of FIG. 1.

As shown in FIG. 4, which is a perspective view of the spacer 55, the spacer 55 is a plate spring, formed with a plurality of convex portions 55*a*, that, when pressed, elastically deforms to thereby generate an activating force. As shown in FIG. 2, in order that no rattling of the annular thin plate assembly 29A is caused in the concave portions 51*a*, 52*a*, the activating force of the spacer 55 urges the annular thin plate assembly 29A on its outer circumferential side against the concave portions 51*a*, 52*a*. The spacer 55 at its upper surface and each of the leaf seal retainers 51, 52 are jointed together by welding as shown by welded places y4, and the relative position of these members is fixed.

Figure 5:
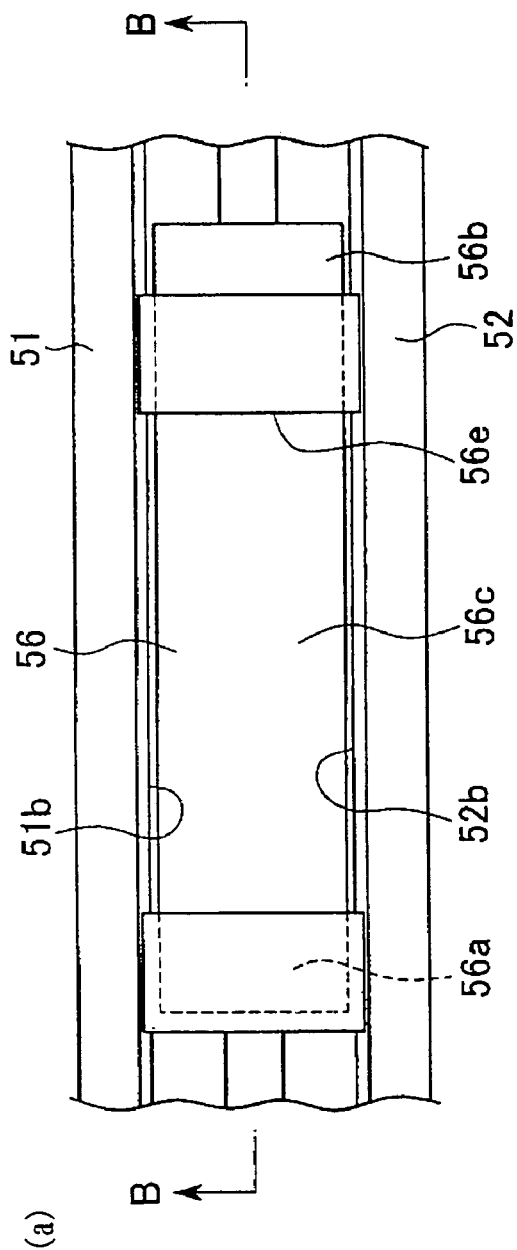
Figure 5:
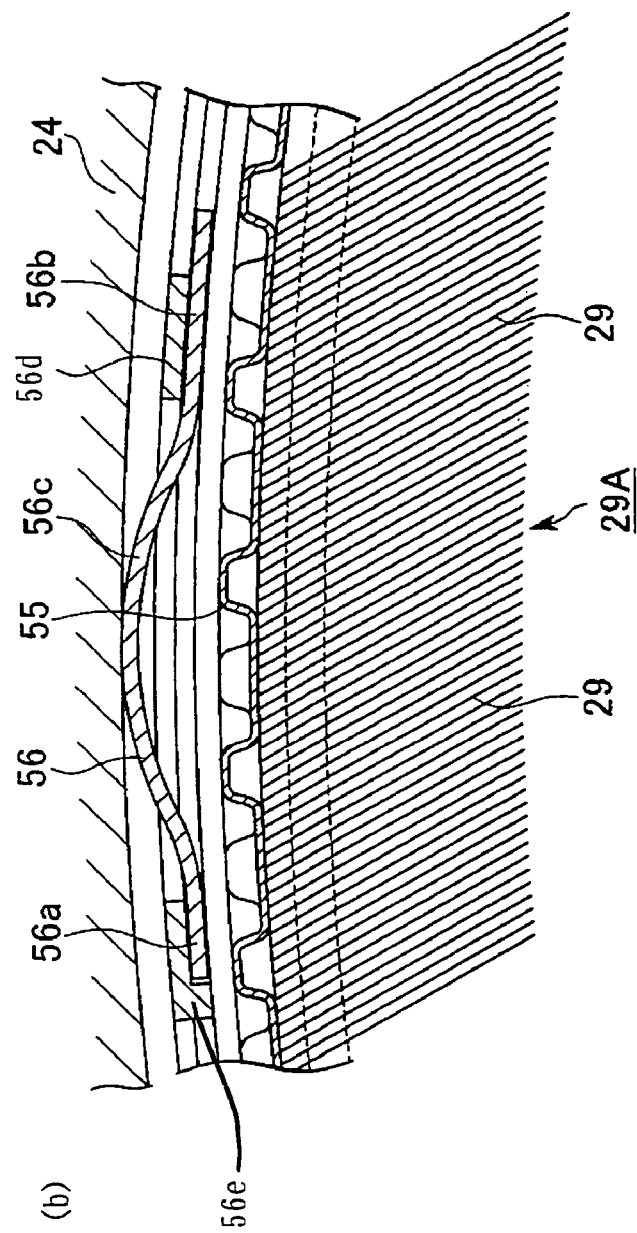

As shown in FIGS. 5(*a*) and 5(*b*), each of the plate springs 56 is arranged on and along an outer circumferential surface of the leaf seal retainers 51, 52 in the concave portion 51*b*, 52*b*. The plate spring 56 has its one end fixed to the outer circumferential surface of the leaf seal retainers 51, 52 as a fixed end 56*a* and the other end retained free as a free end 56*b* of which motion in the axial direction of the rotating shaft 23 relative to the outer circumferential surface of the leaf seal retainers 51, 52 is regulated and of which motion around the axis of the rotating shaft 23 relative to the outer circumferential surface of the leaf seal retainers 51, 52 is allowed. Also, the plate spring 56 has its central portion between the fixed end 56*a* and the free end 56*b* swollen outwardly from the outer circumferential surface of the leaf seal retainers 51, 52 as an activating portion 56*c* of a convex plate shape. That is, the fixed end 56*a*, while it is fitted in the concave portion 51*b*, 52*b*, is pressed down from above by a fixing member 56*e* to be fixed non-movably relative to the outer circumferential surface of the leaf seal retainers 51, 52. Also, the free end 56*b*, while it is fitted in the concave groove 51*b*, 52*b*, is pressed down from above by a guide member 56*d* to be retained so that the relative movement thereof in the axial direction of the rotating shaft 23 is regulated and, at the same time, the relative movement thereof around the axis of the rotating shaft 23 is allowed. Thus, the construction is made such that the plate spring 56 is integrated with the annular thin plate assembly 29A via the leaf seal retainers 51, 52.

The leaf seal 25, constructed as mentioned above, together with a fitting piece (fitting member) 61 is fitted in a concave groove 71 formed in the stator 24 side.

The concave groove 71, when seen on the cross section of FIG. 2, has a minimum size of the groove width w4 that is larger than a minimum size of a plate width w3 of the thin plate 29. In the concave groove 71, a first slidable contact surface 71*a* is formed, with which an inner circumferential surface of the leaf seal retainer 51 makes a slidable contact, and a second slidable contact surface 71*b* is formed, opposed to the first slidable contact surface 71*a*, with which an outer circumferential surface of the plate spring 56 makes a slidable contact. As the concave groove 71 is worked on the premise that a space formed at the time when the leaf seal 25 is fitted in the stator 24 is filled by the fitting piece 61, when the concave groove 71 is formed in the stator 24 side, the work is done such that a minimum size of a groove width w4 of the concave groove 71 becomes larger than the size of thickness of the leaf seal 25. Hence, as compared with a fitting groove of a shaft seal mechanism of a prior art structure, the width of the concave groove 71 is made larger.

In the state that the thin plates 29 are assembled into the concave groove 71 via the leaf seal retainers 51, 52 (that is, in the state that the leaf seal 25 is fitted in), the fitting piece 61, when seen on the cross section of FIG. 2, is an annular member to be fitted in a space formed between the concave groove B71 and one side surface (that is, one side surface on the side of the lower pressure side area) of the fitting piece 61. On this side surface of the fitting piece 61, a third slidable contact surface 61*a* is formed with which the inner circumferential surface of the leaf seal retainer 52 makes a slidable contact and a pressure receiving surface 61*b* on which the lower pressure side plate 54 abuts.

When the fitting piece 61 is fitted in the concave groove 71 and the leaf seal 25 is fitted therein, an outer circumferential side portion thereof (that is, the leaf seal retainers 51, 52 between which the outer circumferential proximal end side of the thin plates 29 is pinched) is arranged movably in the axial direction of the rotating shaft 23 relative to the concave groove 71. Thereby, when the gas pressure (fluid force) acts on the thin plate assembly 29A toward the lower pressure side area from the higher pressure side area, the entire leaf seal 25 moves so that the lower pressure side plate 54 abuts on the pressure receiving surface 61*b* and the gas pressure can be received by the pressure receiving surface 61*b*.

Figure 6:
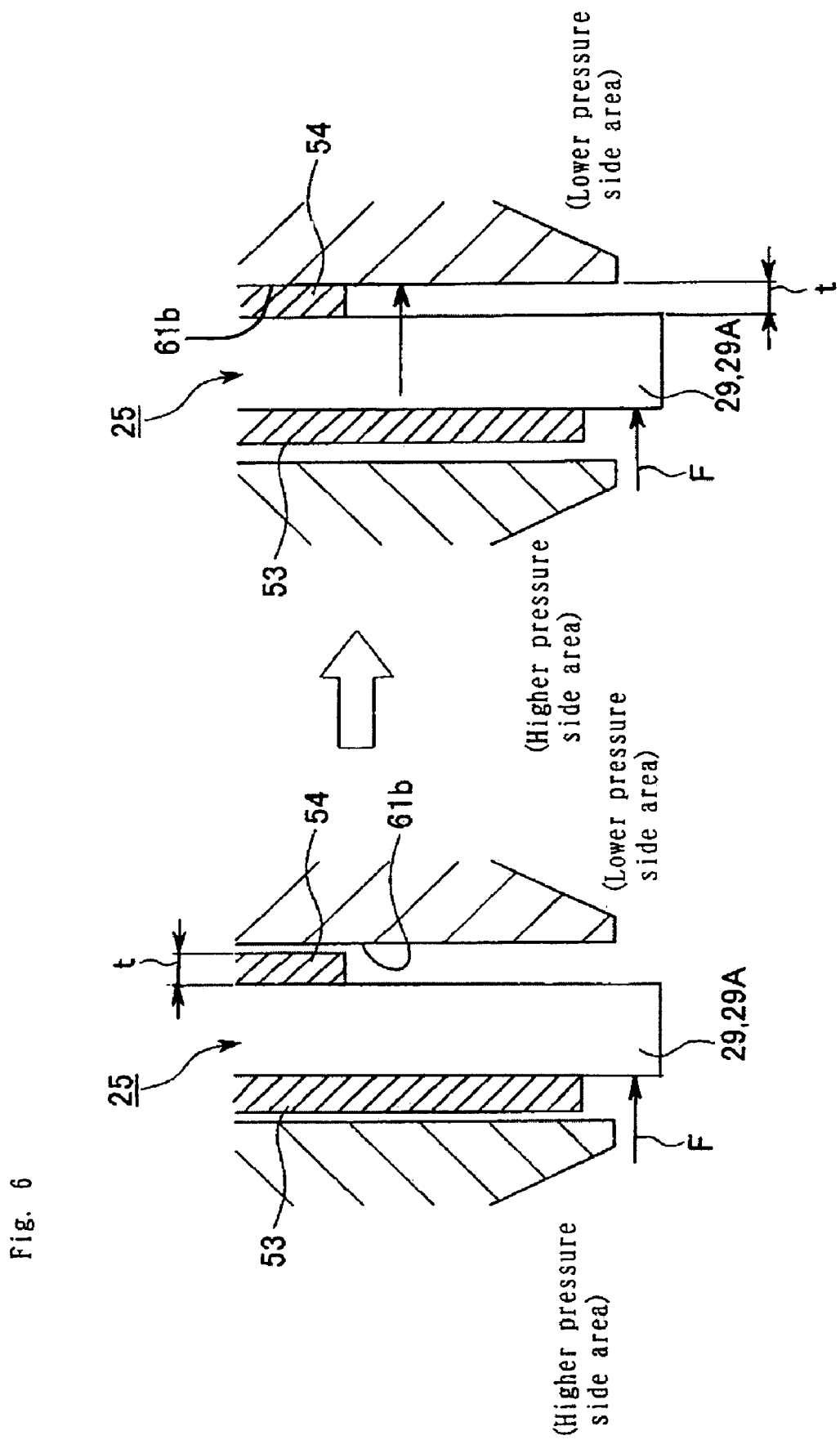
FIG. 6 is an enlarged view of portion C of FIG. 2 showing a main part of the leaf seal of FIG. 1.

At this time, as shown in FIG. 6, the size of a gap formed between a side edge opposed to the lower pressure side area of each of the thin plates 29 and the pressure receiving surface 61*b* is set to the same size as a thickness t of the lower pressure side plate 54 to be fitted in between them. Hence, by setting the size of the thickness t of the lower pressure side plate 54 to the same size as a gap size obtained by an optimal designing, the gap size as designed can be obtained with a high reproducibility.

Also, the fitting piece 61, when seen on the cross section of FIG. 2, is arranged downstream of the annular thin plate assembly 29A (that is, on the side of the lower pressure side area relative to the leaf seal 25) and moreover, on an inner circumferential surface of the fitting piece 61, a labyrinth seal 61d as another seal mechanism is integrally formed so that this labyrinth seal 61 together with the annular thin plate assembly 29A divides the annular space between the stator 24 and the rotating shaft 23 into the higher pressure side area and the lower pressure side area. Thus, the labyrinth seal 61d and the annular thin plate assembly 29A constitute a multiple seal structure and thereby a leakage of the working fluid to the lower pressure side area from the higher pressure side area can be further reduced.

It is to be noted that, while the present embodiment is described with respect to the example where the fitting piece 61 and the labyrinth seal 61d are integrally provided, the present invention is not limited thereto. That is, the original function of the fitting piece 61 aims to facilitate the work of the concave groove 71 and it is not necessarily intended to show that the labyrinth seal 61d is essential.

Figure 7:
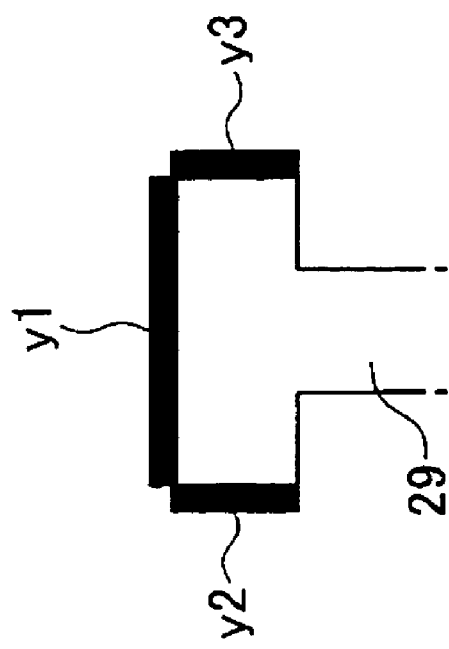
Figure 7:
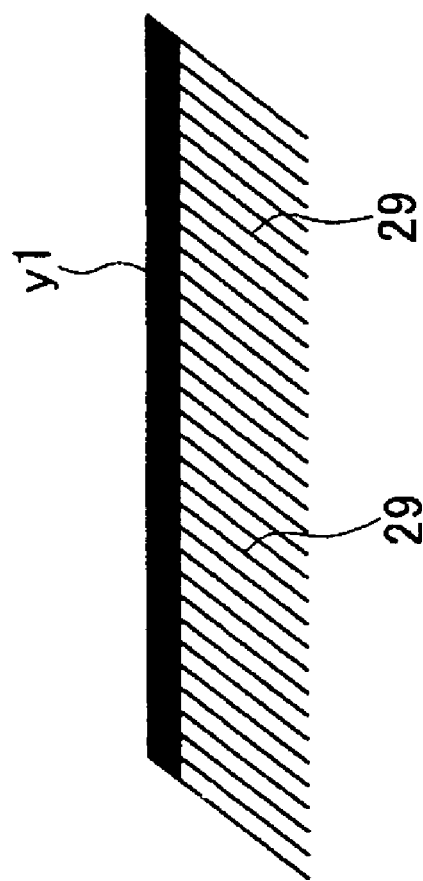
Figure 7:
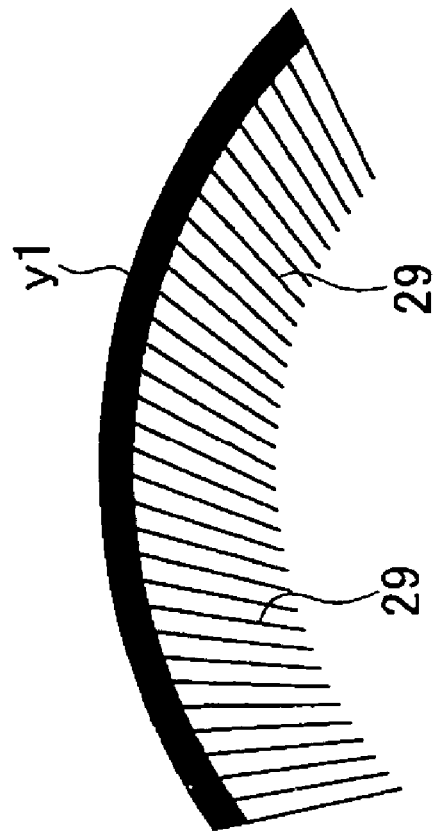

A manufacturing process of the leaf seal 25 constructed as mentioned above and an assembling thereof into the stator 24 will be described next with reference to FIGS. 7 and 8. In the manufacture and assembling of the leaf seal 25, a thin plate welding process, bending process, ring fitting process, plate spring fitting process, fitting piece inserting process and shaft seal member inserting process are carried out.

Firstly, in the thin plate welding process, as shown in FIG. 7(a), each of the thin plates 29, made in the T-shape by punching of a steel plate, is lapped inclinedly one on another so as to form layers and then the mentioned outer circumferential proximal end side of the layers is welded. That is, as shown in FIG. 7(b), each of the thin plates 29 has an outer circumferential end and both side ends of its outer circumferential proximal end side are welded so that the thin plates 29 are jointed together, as shown by welded places y1 to y3.

Then, in the bending process, the thin plates 29, so welded and jointed together, and the leaf seal retainers 51, 52 are roughly bent for a pre-bending before the final process to insert the shaft seal mechanism. FIG. 7(c) shows the state of the thin plates 29 after the bending process.

Figure 8:
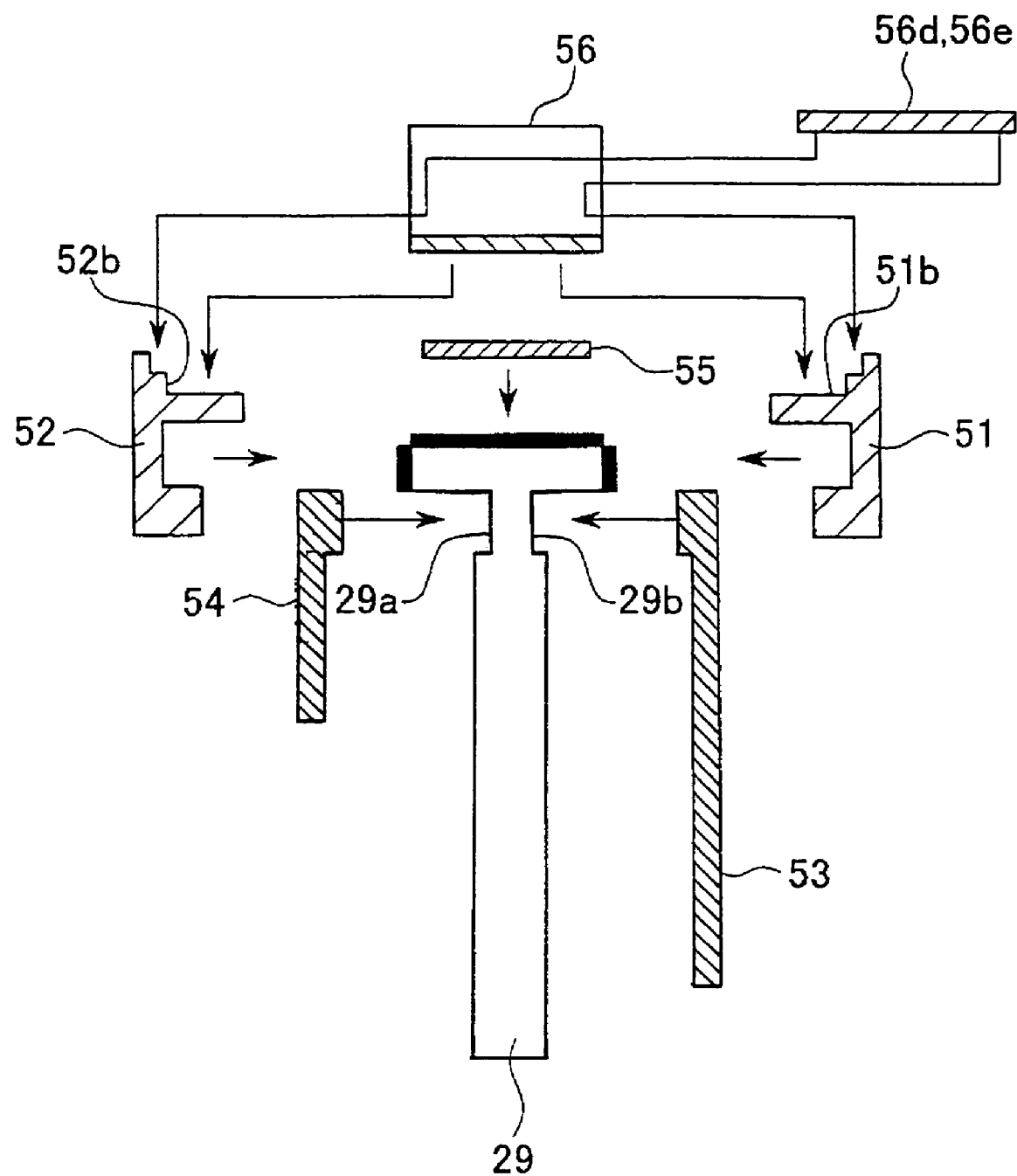
FIG. 8 is an explanatory view showing an assembling method of the leaf seal of FIG. 1 by which a ring fitting process, plate spring fitting process and fitting piece inserting process are explained.
Figure 9:
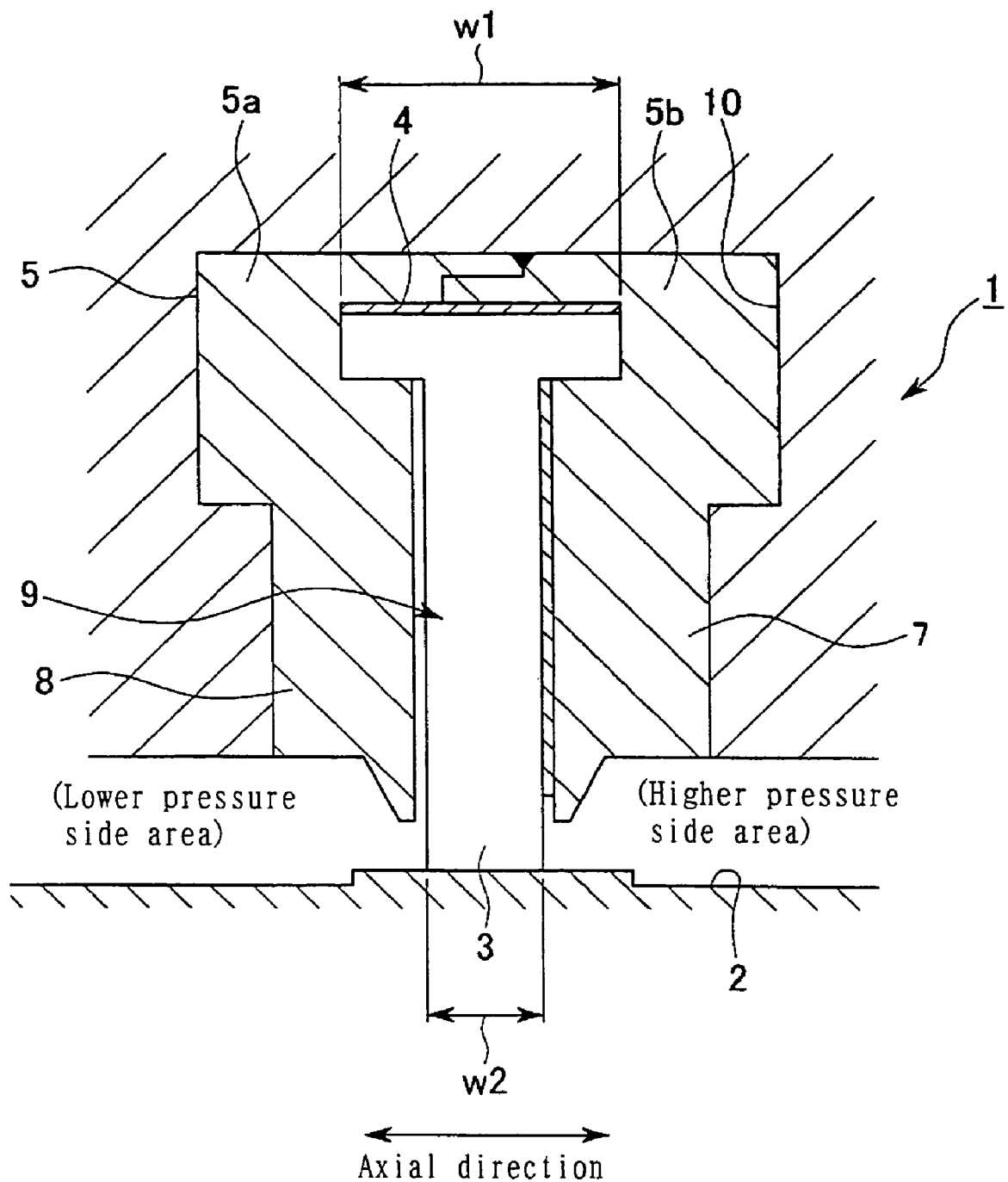
FIG. 9 is a cross sectional view including an axis of a rotating shaft of one example of a prior art shaft seal mechanism.

In the next ring fitting process, as shown in FIG. 8, the outer circumferential proximal end side of the welded thin plates 29, the higher pressure side plate 53, the lower pressure side plate 54 and the spacer 55 are fitted in between the leaf seal retainers 51, 52 and then the leaf seal retainers 51, 52 are fixed together.

That is, the annular higher pressure side plate 53 is first pinched to be retained between the one side edge, opposed to the higher pressure side area, of each of the thin plates 29 and the one leaf seal retainer 51 so as to abut on this one side edge. Likewise, the annular lower pressure side plate 54 is pinched to be retained between the other side edge, opposed to the lower pressure side area, of each of the thin plates 29 and the other leaf seal retainer 52 so as to abut on this other side edge. Then, the spacer 55 for regulating the motion of each of the thin plates 29 relative to the leaf seal retainers 51, 52 is fitted in to be retained between the outer circumferential proximal end side of the thin plates 29 and the leaf seal retainers 51, 52.

The leaf seal retainers 51, 52 so assembled together with the other members are welded to be fixed to the spacer 55 at the welded places y4 (FIG. 2). Thus, fixing of the leaf seal retainers 51, 52 is carried out.

In the next plate spring fitting process, as shown in FIG. 8, the plate spring 56 is fitted into the concave portion 51b, 52b and then the fixed end 56a thereof is fixed by the fixing member 56e and the free end 56b thereof is pressed to be fitted by the guide member 56d. While the free end 56b side is regulated to move in the axial direction of the rotating shaft 23, it is allowed to move in the circumferential direction of the rotating shaft 23. Thus, when the plate spring 56 receives a compression so that the convex plate shape of the activating portion 56c is depressed, the plate spring 56 can elongate along its lengthwise direction (that is, along the outer circumferential surfaces of the leaf seal retainers 51, 52). It is to be noted that fixing of the fixed end 56a may also be directly carried out by welding without using the fixing member 56e.

In the subsequent fitting piece inserting process, the fitting piece 61 is inserted to be fitted along a curvature of the concave groove 71. At this time, care must be taken so that no gap is generated between the side surface on the side of the lower pressure side area of the fitting piece 61 and the concave groove 71.

In the next shaft seal member inserting process, the assembled shaft seal member (the leaf seal 25) is inserted into the concave groove 71 while it is bent along the curvature of the concave groove 71. It is to be noted that the shaft seal member inserting process and the fitting piece inserting process may be carried out at the same time.

According to the manufacturing process of the leaf seal 25 and the method to assemble the leaf seal 25 into the stator 24 as described above, the curvature of the leaf seal 25 can be freely changed according to the place where the leaf seal 25 is to be provided. Hence, such an exclusive jig as in the prior art case is not needed to be individually prepared, and thereby the manufacturing cost can be reduced.

Also, according to the leaf seal 25 manufactured and assembled as mentioned above, as shown on the left side in FIG. 6, a fluid force F acts on the annular thin plate assembly 29A toward the lower pressure side area from the higher pressure side area in operation. Then, as shown on the right side in FIG. 6, while the entire leaf seal 25 is moved toward the lower pressure side area from the higher pressure side area by the fluid force F received by the thin plates 29, the side edges of the thin plates 29 on the side of the lower pressure side area abut against the pressure receiving surface 61b via the lower pressure side plate 54 to stop there. At this time, the gap size formed between the side edges of the thin plates 29 and the pressure receiving surface 61b is ensured to be the same as the thickness size t of the lower pressure side plate 54.

Also, in the annular thin plate assembly 29A as seen on a cross section including a center line of this annular member, when a start-up operation state is changed over to a continuous operation state, the force acting direction is reversed from one direction to the other direction along the direction of this center line and hence a slide motion of the annular thin plate assembly 29A is caused along the direction of the center line. Nevertheless, the plate spring 56 to levitate the annular thin plate assembly 29A moves together with the annular thin plate assembly 29A and thus no inclined slidable contact nor biting of the thin plates 29 is caused.

According to the leaf seal 25 of the present embodiment as described above, the following effect can be obtained:

That is, in the leaf seal assembling structure of the present embodiment, such a structure is employed that there are provided the concave groove 71 having its width formed larger than the minimum size of the plate width w3 of the thin plates 29 and the fitting piece 61 fitted in the gap formed between the concave groove 71 and the thin plates 29 in the state that the thin plates 29 are assembled in the concave groove 71. By this construction, regardless of the width size of the leaf seal 25, the concave groove 71 can be worked so as to have a wider width that is easily workable and thereby the leaf seal 25 having its radial directional portion elongated and its outer circumferential proximal end side formed larger than its inner circumferential distal end side can be easily assembled into the stator 24 side.

Also, according to the turbine 22 of the gas turbine having the above-mentioned assembling structure, the leaf seal 25 having its radial directional portion elongated and its outer circumferential proximal end side formed larger than its inner circumferential distal end side can be easily assembled into the stator 24 side. Thereby, it becomes possible to employ a leaf seal of a smaller size and to make an entire device using this leaf seal more compact.

Also, in the leaf seal assembling structure of the present embodiment, such a structure is employed that the fitting piece 61 is arranged downstream of the leaf seal 25 and a labyrinth seal 61d is provided. By this construction, the labyrinth seal 61d together with the annular thin plate assembly 29A constitutes a multiple seal structure and thereby a leakage of the working fluid to the lower pressure side area from the higher pressure side area can be further reduced.

Also, in the leaf seal 25 of the present embodiment, such a structure is employed that the plate springs 56 are integrally fixed to the outer circumferential surface of the leaf seal 25. By this construction, the plate springs 56 are prevented from making an inclined sidable contact with the outer circumferential surface portion of the leaf seal retainers 51, 52 or from biting therein and thereby the center line of the leaf seal 25 can be always correctly aligned with the axis of the rotating shaft 23. Thus, it becomes possible to cause no damage due to biting of the plate springs 56 and to securely maintain the seal performance.

Also, in the leaf seal assembling structure of the present embodiment, such a structure is employed that the entire leaf seal 25 is made movable relative to the interior of the concave groove 71 and, in the concave groove 71 on the stator 24 side, the pressure receiving surface is provided via the fitting piece 61, and the lower pressure side plate 54 is also provided and is pinched between the side edges of the thin plates 29 and the pressure receiving surface 61 so as to form a predetermined gap size therebetween. By this construction, only by adjusting the thickness size t of the lower pressure side plate 54, the gap size formed between the thin plates 29 and the pressure receiving surface 61 on the lower pressure side can be accurately controlled as designed. Hence, a desired seal performance can be stably obtained. Moreover, the gap size can be easily adjusted as compared with the prior art case only by adjusting the thickness of the lower pressure size plate 54.

Also, in the manufacture and assembling of the leaf seal of the present embodiment, such a method is employed as to compare the thin plate welding process, bending process, ring fitting process, plate spring fitting process, fitting piece inserting process and shaft seal member inserting process. By this method, the curvature of the leaf seal 25 can be freely changed according to the place where the leaf seal 25 is to be provided and hence such an exclusive jig as in the prior art case is not needed to be individually prepared. Thereby, the manufacturing cost of the leaf seal 25 can be reduced.

Also, in the manufacture of the leaf seal of the present embodiment, such a method is employed that, in the ring fitting process, the higher pressure side plate 53 is pinched to be fitted between the one side edge of the thin plates 29 and the one thin plate retaining ring 51. According to this method, fitting of the higher pressure side plate 53 can be easily done and hence a further reduction of the manufacturing cost becomes possible.

Also, in the manufacture of the leaf seal of the present embodiment, such a method is employed that, in the ring fitting process, the lower pressure side plate 54 is pinched to be fitted between the other side edges of the thin plates 29 and the other thin plate retaining ring 52. According to this method, fitting of the lower pressure side plate 54 can be easily done and hence a further reduction of the manufacturing cost becomes possible.

What is claimed is:

1. A shaft seal mechanism structure comprising:
a plurality of thin plates arranged in an annular space between a rotor and a stator so as to form an annular thin plate assembly, said thin plates having an outer circumferential end side supported on said stator and having an inner circumferential end side unattached to an outer circumferential surface of said rotor so that said annular thin plate assembly divides said annular space between said rotor and said stator into a higher pressure side area and a lower pressure side area;
a fitting member provided on only one side of said plurality of thin plates, wherein said fitting member is arranged downstream of said annular thin plate assembly in an axial direction of said rotor, and said fitting member comprises another seal mechanism that, together with said annular thin plate assembly, divides said annular space into said higher pressure side area and said lower pressure side area; and
a concave groove provided within said stator, said concave groove having a minimum groove width larger than a minimum plate width of said thin plates plus said fitting member when seen on a cross section taken along the axis of said rotor, said fitting member being fitted in a gap formed between said concave groove and each of said thin plates in an axial direction of said rotor when each of said thin plates is assembled in said concave groove.

2. A shaft seal mechanism structure according to claim 1, wherein an activating member is integrally provided with said annular thin plate assembly, said activating member supporting said annular thin plate assembly to be levitated coaxially with said rotor.

3. A shaft seal mechanism structure according to claim 2, wherein said activating member comprises a plate spring fixed to an outer circumferential portion of a leaf seal retaining member in which said annular thin plate assembly is retained.

4. A shaft seal mechanism structure according to claim 3, wherein said activating member comprises a bent plate spring fixed to an outer circumferential surface of a leaf seal retaining member in which said annular thin plate assembly is retained, said bent plate spring comprising a fixed end fixed to the outer circumferential surface of said leaf seal retaining member, a free end retained to the outer circumferential surface of said leaf seal retaining member so that a relative motion thereof in an axial direction of said rotor is regulated and a relative motion thereof around an axis of said rotor is allowed and an activating portion of a convex plate shape formed between said fixed end and said free end, said convex plate shape protruding outward from the outer circumferential surface of said leaf seal retaining member.

5. A shaft seal mechanism structure according to claim 2, wherein said activating member comprises a bent plate spring that is fixed to an outer circumferential surface of a leaf seal retaining member in which said annular thin plate assembly is retained, said bent plate spring comprising a fixed end fixed to the outer circumferential surface of said leaf seal retaining member, a free end retained to the outer circumferential surface of said leaf seal retaining member so that a relative motion thereof in an axial direction of said rotor is regulated and a relative motion thereof around an axis of said rotor is allowed and art activating portion of a convex plate shape formed between said fixed end and said free end, said convex plate shape protruding outward from the outer circumferential surface of said leaf seal retaining member.

6. A shaft seal mechanism structure comprising:
a plurality of thin plates arranged in an annular space between a rotor and a stator so as to form an annular thin plate assembly, said thin plates having an outer circumferential end side supported in a concave groove within said stator and having an inner circumferential end side unattached to an outer circumferential surface of said rotor so that said annular thin plate assembly divides said annular space between said rotor and said stator into a higher pressure side area and a lower pressure side area, said thin plates having the outer circumferential end side thereof mounted to be movable in an axial direction of said rotor in said concave groove;
a pressure receiving surface provided in said concave groove so as to receive a fluid force when a fluid force acts on said annular thin plate assembly in a direction toward said lower pressure side area from said higher pressure side area, said thin plates being movable relative to said pressure receiving surface in the axial direction of said rotor; and
a gap forming member pressed between one side edge of said thin plates facing said lower pressure side area and said pressure receiving surface so as to form a gap of predetermined size between said one side edge and said pressure receiving surface, wherein a length of said gap forming member, when seen on said cross section, is formed smaller than a length of a higher pressure side plate arranged on a side edge of said thin plates facing said higher pressure side area.

7. A shaft seal mechanism structure according to claim 6, wherein an activating member is integrally provided with said annular thin plate assembly, said activating member supporting said annular thin plate assembly to be levitated coaxially with said rotor.

8. A shaft seal mechanism structure according to claim 7, wherein said activating member comprises a plate spring fixed to an outer circumferential portion of a leaf seal retaining member in which said annular thin plate assembly is retained.

9. A shaft seal mechanism structure according to claim 8, wherein said activating member comprises a bent plate spring fixed to an outer circumferential surface of a leaf seal retaining member in which said annular thin plate assembly is retained, said bent plate spring comprising a fixed end fixed to the outer circumferential surface of said leaf seal retaining member, a free end retained to the outer circumferential surface of said leaf seal retaining member so that a relative motion thereof in an axial direction of said rotor is regulated and a relative motion thereof around an axis of said rotor is allowed and an activating portion of a convex plate shape formed between said fixed end and said free end, said convex plate shape protruding outward from the outer circumferential surface of said leaf seal retaining member.

10. A shaft seal mechanism structure according to claim 7, wherein said activating member comprises a bent plate spring fixed to an outer circumferential surface of a leaf seal retaining member in which said annular thin plate assembly is retained, said bent plate spring comprising a fixed end fixed to the outer circumferential surface of said leaf seal retaining member, a free end retained to the outer circumferential surface of said leaf seal retaining member so that a relative motion thereof in an axial direction of said rotor is regulated and a relative motion thereof around an axis of said rotor is allowed and an activating portion of a convex plate shape formed between said fixed end and said free end, said convex plate shape protruding outward from the outer circumferential surface of said leaf seal retaining member.

11. A large size fluid machine comprising a rotor and a stator to generate power by converting thermal energy of a high temperature, high pressure working fluid into mechanical rotational energy and further comprising a shaft seal mechanism and a shaft seal mechanism structure to reduce leakage of the working fluid along said rotor, said shaft seal mechanism comprising:
a plurality of thin plates arranged in an annular space between a rotor and a stator so as to form an annular thin plate assembly, said thin plates having an outer circumferential end side supported on said stator and having an inner circumferential end side unattached to an outer circumferential surface of said rotor so that said annular thin plate assembly divides said annular space between said rotor and said stator into a higher pressure side area and a lower pressure side area;
a fitting member provided on only one side of said plurality of thin plates, wherein said fitting member is arranged downstream of said annular thin plate assembly in an axial direction of said rotor, and said fitting member comprises another seal mechanism that, together with said annular thin plate assembly, divides said annular space into said higher pressure side area and said lower pressure side area; and
a concave groove provided within said stator, said concave groove having a minimum groove width larger than a minimum plate width of said thin plates plus said fitting member when seen on a cross section taken along the axis of said rotor, said fitting member being fitted in a gap formed between said concave groove and each of said thin plates in an axial direction of said rotor when each of said thin plates is assembled in said concave groove.

12. A large size fluid machine according to claim 11, wherein an activating member is integrally provided with said annular thin plate assembly, said activating member supporting said annular thin plate assembly to be levitated coaxially with said rotor.

13. A large size fluid machine according to claim 12, wherein said activating member comprises a plate spring fixed to an outer circumferential portion of a leaf seal retaining member in which said annular thin plate assembly is retained.

14. A large size fluid machine according to claim 13, wherein said activating member comprises a bent plate spring fixed to an outer circumferential surface of a leaf seal retaining member in which said annular thin plate assembly is retained, said bent plate spring comprising a fixed end fixed to the outer circumferential surface of said leaf seal retaining member, a free end retained to the outer circumferential surface of said leaf seal retaining member so that a relative motion thereof in an axial direction of said rotor is regulated and a relative motion thereof around an axis of said rotor is allowed and an activating portion of a convex plate shape formed between said fixed end and said free end, said convex plate shape protruding outward front the outer circumferential surface of said leaf seal retaining member.

15. A large size fluid machine according to claim 12, wherein said activating member comprises a bent plate spring fixed to an outer circumferential surface of a leaf seal retaining member in which said annular thin plate assembly is retained, said bent plate spring comprising a fixed end fixed to the outer circumferential surface of said leaf seat retaining member, a free end retained to the outer circumferential surface of said leaf seal retaining member so that a relative motion thereof in an axial direction of said rotor is regulated and a relative motion thereof around an axis of said rotor is allowed and an activating portion of a convex plate shape formed between said fixed end and said free end, said convex plate shape protruding outward from the outer circumferential surface of said leaf seal retaining member.

16. A large size fluid machine comprising a rotor and a stator to generate power by converting thermal energy of a high temperature, high pressure working fluid into mechanical rotational energy and further comprising a shaft seal mechanism and a shaft seal mechanism structure to reduce leakage of the working fluid along said rotor, said shaft seal mechanism comprising:
   a plurality of thin plates arranged in an annular space between a rotor and a stator so as to form an annular thin plate assembly, said thin plates having an outer circumferential end side supported in a concave groove within said stator and having an inner circumferential end side unattached to an outer circumferential surface of said rotor so that said annular thin plate assembly divides said annular space between said rotor and said stator into a higher pressure side area and a lower pressure side area, said thin plates having the outer circumferential end side thereof mounted to be movable in an axial direction of said rotor in said concave groove;
   a pressure receiving surface provided in said concave groove so as to receive a fluid force when a fluid force acts on said annular thin plate assembly in a direction toward said lower pressure side area from said higher pressure side area, said thin plates being moveable relative to said pressure receiving surface in the axial direction of said rotor; and
   a gap forming member pressed between one side edge of said thin plates facing said lower pressure side area and said pressure receiving surface so as to form a predetermined gap size between said one side edge and said pressure receiving surface, wherein a length of said gap forming member, when seen on said cross section, is formed smaller than a length of a higher pressure side plate arranged on a side edge of said thin plates facing said higher pressure side area.

17. A large size fluid machine according to claim 16, wherein an activating member is integrally provided with said annular thin plate assembly, said activating member supporting said annular thin plate assembly to be levitated coaxially with said rotor.

18. A large size fluid machine according to claim 17, wherein said activating member comprises a plate spring fixed to an outer circumferential portion of a leaf seal retaining member in which said annular thin plate assembly is retained.

19. A shaft seal mechanism structure according to claim 18, wherein said activating member comprises a bent plate spring fixed to an outer circumferential surface of a leaf seal retaining member in which said annular thin plate assembly is retained, said bent plate spring comprising a fixed end fixed to the outer circumferential surface of said leaf seal retaining member, a free end retained to the outer circumferential surface of said leaf seal retaining member so that a relative motion thereof in an axial direction of said rotor is regulated and a relative motion thereof around an axis of said rotor is allowed and an activating portion of a convex plate shape formed between said fixed end and said free end, said convex plate shape protruding outward from the outer circumferential surface of said leaf seal retaining member.

20. A shaft seal mechanism structure according to claim 17, wherein said activating member comprises a bent plate spring fixed to an outer circumferential surface of a leaf seal retaining member in which said annular in plate assembly is retained, said bent plate spring comprising a fixed end fixed to the outer circumferential surface of said leaf seal retaining member, a free end retained to the outer circumferential surface of said leaf seal retaining member so that a relative motion thereof in an axial direction of said rotor is regulated and a relative notion thereof around an axis of said rotor is allowed and an activating portion of a convex plate shape formed between said fixed end and said free end, said convex plate shape protruding outward from the outer circumferential surface of said leaf seal retaining member.

* * * * *